United States Patent [19]
Zeiger et al.

[11] 3,818,775
[45] June 25, 1974

[54] CONCENTRIC DIFFERENTIAL GEARING ARRANGEMENT

[75] Inventors: Robert J. Zeiger, San Jose; John C. Gerdts, Campbell, both of Calif.

[73] Assignee: The United States of America as represented by the Administrator of the National Aeronautics and Space Administration, Washington, D.C.

[22] Filed: Nov. 29, 1972

[21] Appl. No.: 310,615

[52] U.S. Cl. .................................... 74/675, 74/710
[51] Int. Cl. ...................... F16h 37/08, F16h 1/38
[58] Field of Search ............................ 74/675, 710

[56] References Cited
UNITED STATES PATENTS

| | | | |
|---|---|---|---|
| 1,720,018 | 7/1929 | Tubbs | 74/675 |
| 2,196,368 | 4/1940 | Thomson | 74/675 |
| 2,221,186 | 11/1940 | Grosch | 74/675 |
| 2,911,760 | 11/1959 | Banadell-Smith | 74/675 |
| 2,940,337 | 6/1940 | Kalb | 74/675 |
| 3,326,060 | 6/1967 | Rasmussen | 74/675 |
| 3,364,789 | 1/1968 | Whitfield | 74/675 |

FOREIGN PATENTS OR APPLICATIONS

| | | | |
|---|---|---|---|
| 483,519 | 5/1952 | Canada | 74/675 |

*Primary Examiner*—Samuel Scott
*Assistant Examiner*—P. S. Lall
*Attorney, Agent, or Firm*—Darrell G. Brekke; Armand G. Morin, Sr.; John R. Manning

[57] ABSTRACT

Two input members and two concentric rotatable output members are interconnected by a planetary gear arrangement. The first input drives directly the first output. The second input engages a carrier having the planetary gears affixed thereto. Rotation of the carriage causes rotation of the central sun gear of the planetary gear system. The sun gear is journaled to the carriage and is drivingly connected to the second output through a direction reversing set of bevel gears. The first input drive member includes a ring gear drivingly connected to the planetary gears for driving the second output member in the same direction and by the same amount as the first output member. Motion of the first input results in equal motion of the two outputs while input motion of the second input results in movement of the second output relative to the first output. This device is useful where non-interacting two-axis control of remote gimbaled systems is required.

6 Claims, 2 Drawing Figures

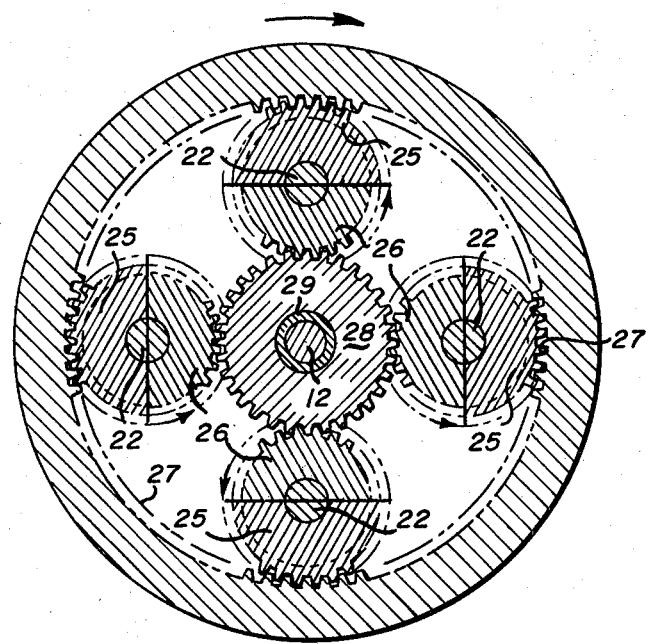
Fig_2

CONCENTRIC DIFFERENTIAL GEARING ARRANGEMENT

GOVERNMENT RIGHTS

The invention described herein was made by employees of the United States Government and may be manufactured and used by or for the Government for governmental purposes without the payment of any royalties thereon or therefor.

BACKGROUND OF THE INVENTION

The invention relates to differential gearing and more particularly to differential gearing having two inputs and two outputs.

Prior art devices for producing unitary rotation of dual outputs of a differential gear set have generally included mounting one of the output drive gear trains on the other output drive gear to prevent interaction between the two output members or shafts. One of the problems encountered in mounting the first output drive on the second output drive is that it is difficult to provide continuous rotation of both outputs.

SUMMARY OF THE PRESENT INVENTION

The principal object of the present invention is the provision of an improved concentric output differential gearing arrangement.

In one feature of the present invention a first rotatable output is driven directly from a first input. A second rotatable output, concentric with the first output, is driven from the first output via a planetary gear arrangement. This planetary gear arrangement serves as the drive for the second output and is carried on a carriage. The first and second outputs are driven together from the first drive input. The second output is driven by the second input to obtain relative motion between the two outputs.

In another feature of the present invention, the planetary gear arrangement for driving the second output includes a sun gear driven by surrounding planetary gears and wherein the sun gear is drivingly connected to the second output via the intermediary of a differential bevel gear arrangement, whereby rotation of the second output is in the opposite direction to the rotation of the sun gear.

In another feature of the present invention, the second output is a shaft concentrically disposed of and axially coextensive with the sun gear, as well as the first output.

In another feature of the present invention, the inputs may be concentrically disposed.

In another feature of the present invention, the second output is threadably mated with a nut which is captured against rotation of the first output member, whereby relative rotation between the first and second outputs produces rectilinear translation of the nut relative to the first output member.

Other features and advantages of the present invention will become apparent upon a perusal of the following specification taken in connection with the accompanying drawings wherein:

BRIEF DESCRIPTION OF THE DRAWINGS

FIG. 2 is a sectional view of the structure of FIG. 1 taken along line 2—2 in the direction of the arrows.

DESCRIPTION OF THE PREFERRED EMBODIMENTS

Figure 1:
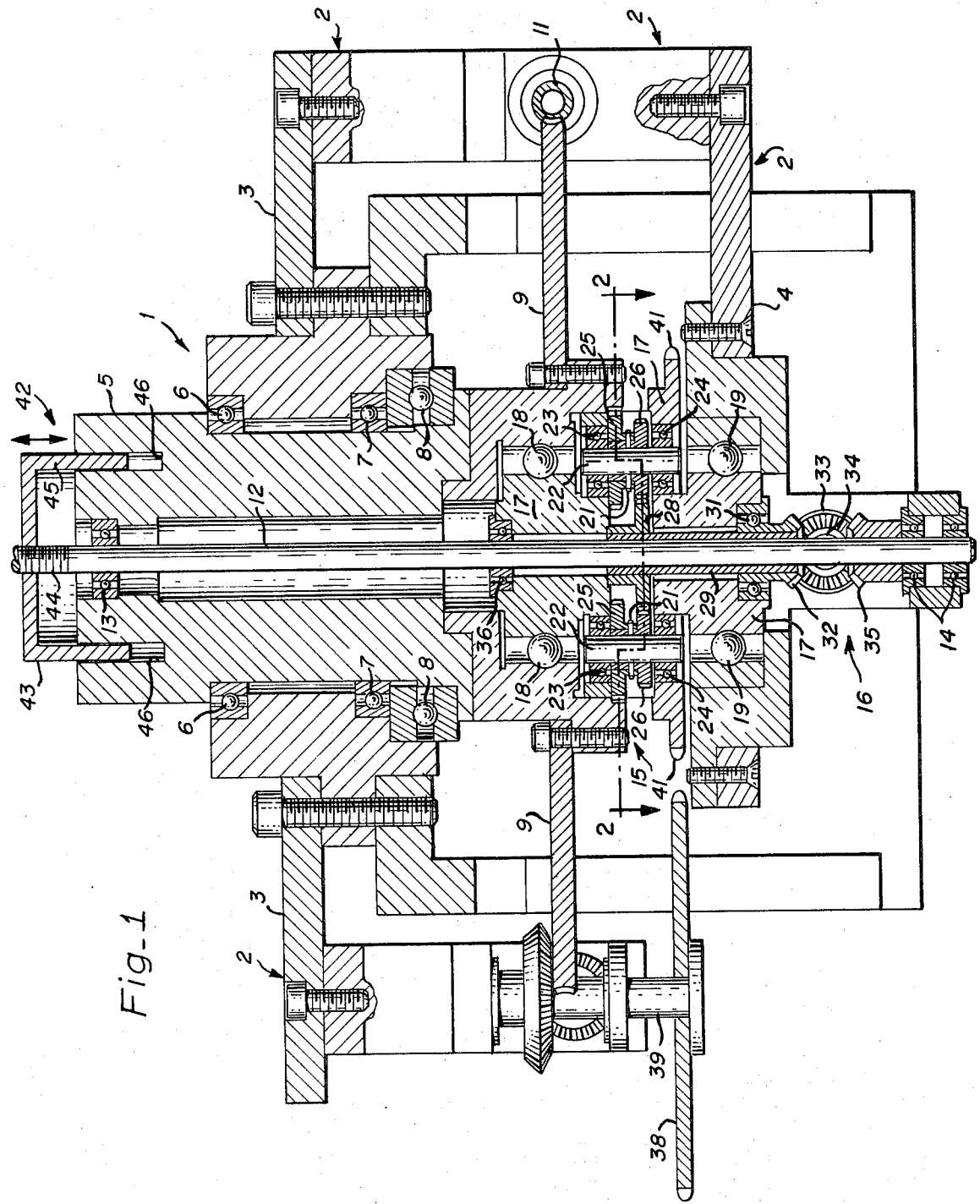
FIG. 1 is a longitudinal sectional view of a concentric output differential gearing arrangement of the present invention.

Referring now to FIGS. 1 and 2, there is shown the concentric output differential gearing arrangement 1 of the present invention. The differential gearing arrangement 1 includes a cage or housing 2 having axially spaced centrally apertured end plate structures 3 and 4.

A first output cylinder 5 is journalled via ball bearings 6 and 7 and thrust ball bearings 8 to the cage 2 for allowing the first output 5 to be rotatably supported from the cage 2. A worm gear 9 is affixed to the first output cylinder 5 for rotatably driving the first output relative to the cage 2. The first input drive, worm drive shaft 11 is journalled to the cage 2 and mates with the external teeth of the worm gear 9 for directly driving the output cylinder 5.

A second rotatably output member or shaft 12 is coaxially disposed in the first output cylinder 5 and is journaled to the output cylinder 5 and to the lower plate 4 of the cage structure 2 via ball bearing assemblies 13 and 14. When the second input drive is not operative, the second output shaft 12 is rotatably driven in the same direction and at the same angular velocity as the first output cylinder 5 via the intermediary of a planetary gear arrangement 15 and a bevel differential gear arrangement 16. More particularly, a planetary gear carriage structure 17 is journaled to the output cylinder 5 and to the lower plate 4 of the cage 2 via ball bearing assemblies 18 and 19.

The planetary gear arrangement 15 is carried from the rotatable carriage structure 17. The planetary gear structure includes four planetary spur gears 21 fixedly secured to respective shafts 22, which in turn are journaled via ball bearing assemblies 23 and 24 to the carriage structure 17. In this manner the planetary spur gears 21 are carried with the rotation of the carriage 17 and are free to rotate with their respective shafts 22. Each of the spur gears 21 includes two sets of external teeth 25 and 26. The upper set of teeth 25 mates with the internal teeth of the surrounding ring gear 27 which is secured to the output cylinder 5. The lower set of teeth 26 on each of the planetary spur gears 21 meshes with the external teeth of a centrally disposed sun gear 28.

Sun gear 28 is coaxially disposed from the second output shaft 12 and includes a sleeve portion 29 attached therefrom which is journaled to the carriage 17 via ball bearing assembly 31. A bevel ring gear 32 is secured to the lower end of the sun gear sleeve 29 and serves as the drive gear for the differential bevel gear arrangement 16. More particularly, the differential bevel gear assembly 16 includes a pair of idler bevel ring gears 33 meshing with the bevel drive ring gear 32 and pivotedly supported from the cage 2 via coaxial shafts 34 perpendicularly directed to the second output shaft 12. The shafts 34 are journaled to the cage 2. A bevel gear 35 is secured to the second output shaft 12 and meshes with the idler bevel gears 33 for reversing the direction of rotation of the output shaft 12 relative to the direction of rotation of the sun gear 28.

The planetary gear arrangement 15, including the sun gear 28 and the differential bevel gear arrangement 16, serves to cause both the first output cylinder 5 and the second output shaft 12 to rotate in the same direction and with the same angular velocity such that both output members 5 and 12 rotate together when driven via worm gear 9 and worm drive shaft 11. The second output shaft 12 is journaled to the carriage 17 via ball baering assembly 36.

The second input drive is provided with a drive sprocket 38 rotatably carried from the cage 2 via a drive shaft 39. A drive chain, not shown, interconnects the drive sprocket 38 with an externally toothed sprocket portion 41 of the carriage structure 17. Thus, independent rotatable drive of carriage 17 is obtained by rotation of the second input drive shaft 39. This rotation through the action of the planetary spur gears 21 and the fixed outer ring gear 27 causes planetary gears 21 to rotate. These gears in turn cause rotation of the central sun gear 28 and thus drive through the differential bevel gear arrangement 16 for the output drive shaft 12. This second gear drive train does not produce rotation of the first output drive cylinder 5.

Thus, in operation, rotational drive applied via worm drive shaft 11 and worm gear 9 is translated into equal angular motion of the first and second output members 5 and 12, whereas rotation of the carriage 17 via sprocket drive 38 and 41 produces independent or phase rotation of the second output shaft 12 relative to the first output cylinder 5. Continuous rotation of the input worm drive shaft 11 and drive sprocket 38 produce, if desired, continuous rotation of the output members 5 and 12.

Thus far described, the concentric output differential gearing arrangement 1 provides means for obtaining two controllable concentric rotatable outputs 5 and 12. If desired one of the rotatable outputs may be converted into a rectilinear output by a translational converting device 42 shown coupled to the output of the differential gearing arrangement 1. More particularly, the translation converting device 42 includes a nut 43 threadably mated with a threaded portion 44 of the second output shaft 12. The nut 43 includes a plurality of dependent legs 45 slidably inserted within axially directed bores 46 in the first output member 5. The bores 46 and legs 45 serve to capture the nut 43 against rotation, while permitting axially rectilinear transition of nut 43 relative to the first output member 5. Thus, in operation, relative rotation of the second output shaft 12, relative to the first output member 5, is converted into axial rectilinear translation of the nut 43 relative to the first output member 5. In this embodiment the nut serves as an output stage to which an element to be independently translated and rotated is to be affixed Although, thus far described, the concentric output differential gearing arrangement 1 has been described as employing the differential bevel gear assembly 16 for reversing the rotation of the output shaft 12 relative to the direction of rotation of the sun gear 28, this is not a requirement. As an alternative, the differential bevel gear assembly 16 may be deleted and the sun gear secured directly to the second output shaft 12. An extra set of planetary idler gears, not shown, may be provided between planetary gears 21 and the drive ring gear 27. These idler gears cause the rotation of the sun gear 28 to be in opposition to the direction of rotation of the planetary gear carriage structure 17.

The advantage of the concentric output differential gearing arrangement of the present invention is that it allows two output shafts to be rotated as a unit by one input or a single output shaft to be rotated by the other input. Such compensating drive is required for continuous non-interacting rotary two-axis gimbaled motion. Such a device is potentially useful where such two-axis independent movement is required, such as in remote-controlled devices in wind tunnels, astronomy, spectrometers, optical devices, aiming and pointing devices, etc.

What is claimed is:

1. In a concentric differential gearing arrangement first and second concentric output members, cage means for rotatably supporting said first and second output members, first input drive means for rotatably driving said first output member, a carriage structure rotatably supported relative to said cage means and said first output member and being concentrically rotatable relative to said first and second output members, a plurality of planetary gears carried from said carriage structure, sun gear means centrally disposed of said planetary gears and drivingly connected with said planetary gears and with said second output member, an internally toothed ring gear secured to said first output member and drivingly connected to said planetary gears for driving said gun gear and for, in turn, rotatably driving said second output member with rotation of said first output member to cause said first and second output members to rotate an equal amount in the same direction, second input drive means for rotating said carriage structure to cause said second output member to be rotated via said planetary gears and said sun gear independently of rotation of said first output member.

2. The apparatus of claim 1 including a first bevel gear secured to said sun gear, a second bevel gear secured to said second output member, and differential bevel gear means rotatable carried from said cage means and drivingly interconnecting said first and second bevel gear means for causing said second output member to be rotated in the opposite direction as said sun gear.

3. The apparatus of claim 1 wherein said sun gear includes, a ring gear coaxially disposed of said second output member, and wherein said carriage structure is centrally apertured and coaxially disposed of said second output member.

4. The apparatus of claim 1 wherein said second output member is a shaft, and means for journaling said second output member relative to said first output member and relative to said carriage structure.

5. The apparatus of claim 4 including, means for journaling said sun gear relative to said carriage structure.

6. The apparatus of claim 4 including, nut means threadably mating with a threaded portion of said second output member, and means for rotatably capturing said nut means to said first output member, whereby rotation of said second output member relative to said first output member produces rectilinear translation of said nut means relative to said first output member.

* * * * *